(12) United States Patent
Holliday

(10) Patent No.: US 6,661,373 B1
(45) Date of Patent: Dec. 9, 2003

(54) ANTENNA ALIGNMENT METER

(75) Inventor: David Holliday, Isleworth (GB)

(73) Assignee: British Sky Broadcasting Limited, Middlesex (GB)

( * ) Notice: Subject to any disclaimer, the term of this patent is extended or adjusted under 35 U.S.C. 154(b) by 0 days.

(21) Appl. No.: 09/807,009
(22) PCT Filed: Oct. 15, 1999
(86) PCT No.: PCT/GB99/03418

§ 371 (c)(1),
(2), (4) Date: Jun. 20, 2001

(87) PCT Pub. No.: WO00/24083

PCT Pub. Date: Apr. 27, 2000

(30) Foreign Application Priority Data

Oct. 16, 1998 (GB) .............................. 9822678

(51) Int. Cl.[7] .............................. H01Q 3/00; H04B 7/19
(52) U.S. Cl. ........................................ 342/359; 342/356
(58) Field of Search ................................. 342/359, 356

(56) References Cited

U.S. PATENT DOCUMENTS

| | | | |
|---|---|---|---|
| 4,862,179 A | | 8/1989 | Yamada |
| 4,888,592 A | * | 12/1989 | Paik et al. ................... 342/356 |
| 5,287,115 A | * | 2/1994 | Walker et al. ............... 342/359 |
| 5,515,058 A | * | 5/1996 | Chaney et al. .............. 342/359 |
| 5,587,717 A | | 12/1996 | Jang |
| 5,726,661 A | | 3/1998 | Fuji |
| 6,229,480 B1 | * | 5/2001 | Shintani ...................... 342/359 |

FOREIGN PATENT DOCUMENTS

| | | |
|---|---|---|
| EP | 0116133 A1 | 8/1984 |
| EP | 0 361 885 A2 | 4/1990 |
| EP | 0516452 A2 | 12/1992 |
| EP | 0579407 A1 | 1/1994 |
| EP | 0579408 A1 | 1/1994 |
| EP | 0 687 028 A1 | 12/1995 |
| WO | WO 99/34475 A2 | 7/1999 |

OTHER PUBLICATIONS

International Search Report.

* cited by examiner

Primary Examiner—Thomas H. Tarcza
Assistant Examiner—F H Mull
(74) Attorney, Agent, or Firm—Rothwell, Figg, Ernst & Manbeck

(57) ABSTRACT

The present invention relates to an antenna alignment meter which comprises a receiver for detecting a signal with predetermined characteristics and outputting data pertaining to the detection of the signal, and a controller responsive to the data from the receiver for controlling generation of an indicator that signal has been received. The meter can be used for aligning an antenna with a signal source. The meter is arranged to monitor signals received by the antenna and to provide an indication of correct alignment of the antenna with a desired signal source when a signal of a predetermined frequency, polarization, symbol rate and error correction is received.

35 Claims, 1 Drawing Sheet

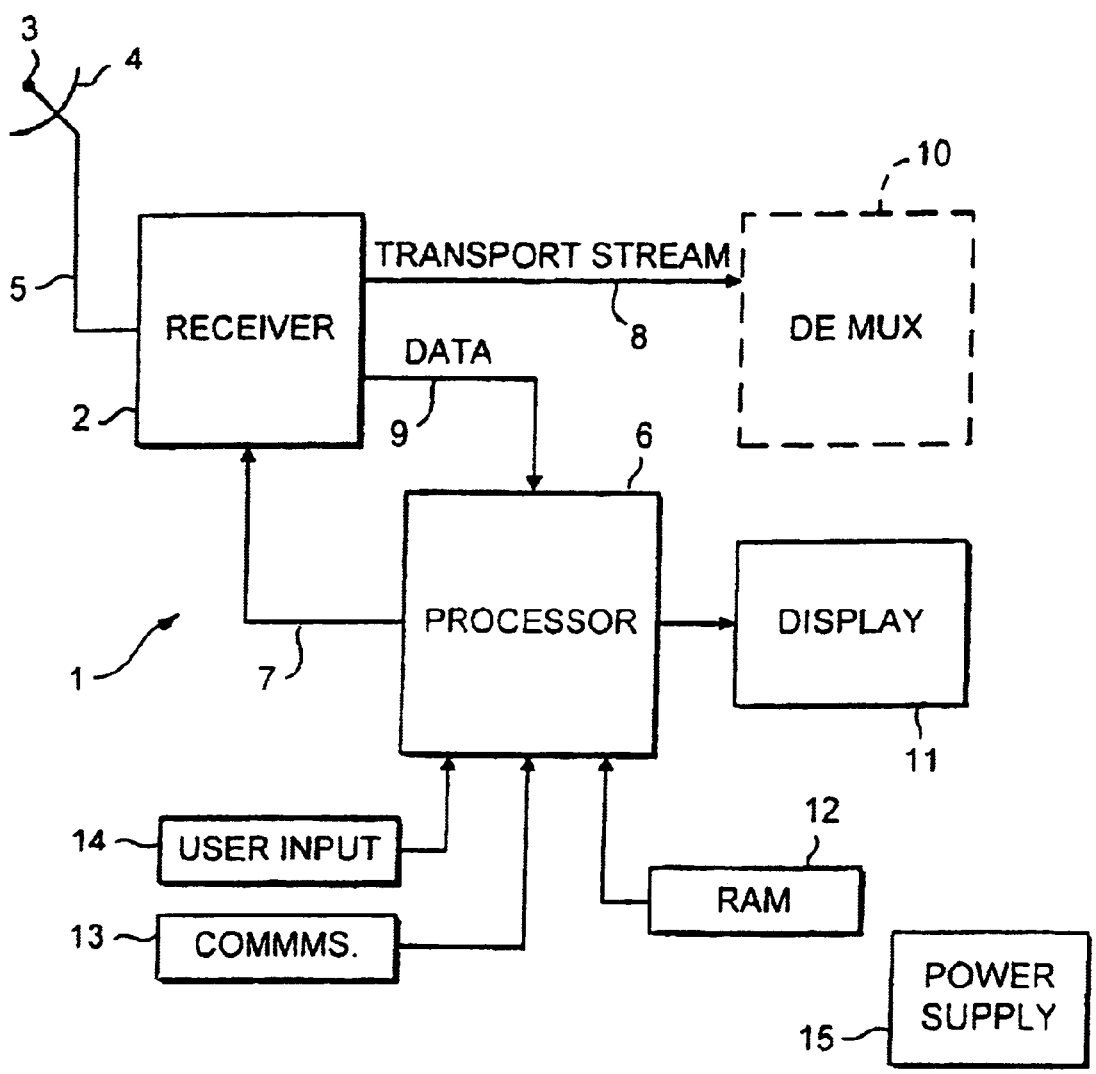

ANTENNA ALIGNMENT METER

BACKGROUND OF THE INVENTION

There are now several satellites in relatively close proximity to each other (when seen from the ground) transmitting television at the same or similar frequencies to one another. Many satellite receiver systems comprise a fixed antenna which is aligned with a single satellite to receive television signals therefrom. The close proximity of several satellites all transmitting at the same or similar frequencies makes it difficult to align an antenna with the correct satellite during installation. Using only a signal strength meter it is all too easy for an taller mistakenly to align the antenna with a nearby satellite transmitting at the same frequency as the correct satellite. Identifying and correcting such an error is relatively straightforward: when decoded and viewed on a television screen it will be immediately apparent that the wrong signal is being received. However, relying on viewing the picture is time consuming and therefore undesirable.

SUMMARY OF THE INVENTION

The present invention aims to facilitate installation of a satellite system by improving the confidence of the correct signal being received.

In one aspect the invention provides an antenna alignment meter comprising a signal detector circuit for detecting a signal with predetermined characteristics and outputting data pertaining to the detection of the signal; a connector for connecting the signal detector circuit to an antenna; and a controller responsive to the data from the detector circuit for controlling generation of an indicator that the signal has been detected.

In another aspect the invention provides a method of aligning an antenna with a signal source, the method comprising: connecting the antenna to an antenna alignment meter; adjusting the orientation of the antenna until the antenna alignment meter indicates detection of a signal with predetermined characteristics; and locking the antenna in position.

The invention also provides an apparatus for aligning an antenna with a signal source, the apparatus being arranged to monitor signals received by the antenna and to provide an indication of correct alignment of the antenna with a desired signal source when a signal of a predetermined frequency, polarization, symbol rate and error correction ratio is received.

The above and further features of the invention are set forth with particularity in the appended claims and together with advantages thereof will become clearer from consideration of the following detailed description of an exemplary embodiment of the invention given with reference to the accompanying drawings.

BRIEF DESCRIPTION OF THE DRAWINGS

The Figure is a schematic diagram of an antenna alignment meter.

DETAILED DESCRIPTION OF AN EMBODIMENT OF THE INVENTION

Referring now to the Figure an antenna alignment meter 1 comprises a receiver 2 which is preferably a digital satellite Network Interface Module (NIM) by GEC Plessey Semiconductors. The receiver 2 is connectable to the low noise block (LNB) 3 of an antenna 4 via a coaxial line 5.

A processor 6 is connected to the receiver 2 by way of a control path 7 and is arranged to send control data to the receiver 2 via the control path 7. The receiver 2 can be tuned to a signal of given characteristics depending on the control data from the processor 6. When the receiver is receiving a signal having the given characteristics the receiver outputs a transport stream on path 8 and a "locked" flag or signal on data path 9. The locked flag thus provides an indication to the processor 6 that the receiver 2 is receiving a signal of the given characteristics.

The transport stream contains all the service information carried in the received signal. The information may include several television signals (video and/or audio) and service signals. The transport stream may therefore be input to demultiplexer and decoder circuitry 10 to enable television pictures to be viewed on a suitable monitor. However it is envisaged that the meter 1 will be supplied as a hand-held unit to facilitate installation of antennas on the outside of buildings. As such the meter should be as small and light as possible and therefore demultiplexer and decoder circuitry will not be necessary because there will be no need to view television pictures. Furthermore, such circuitry is expensive and would make the meter prohibitively expensive for use in routine receiver system installations. Normally, therefore, the meter 1 will not include the demultiplexer and decoder circuitry 10.

The processor 6 is also connected to drive a display 11. Among other things, the processor 6 is arranged to cause the display 11 to display an indication of when the receiver 2 is receiving a signal having the given characteristics. The processor 6 has associated with it a memory including RAM 12 in which is stored data defining among other things the given characteristics of the signal to which the receiver 2 is to be tuned. A communications port 13 is provided to enable the data in the RAM 12 to be changed if required.

Operation of the meter 1 is controlled by a user input device 14, typically in the form of keys connected to the processor 6. The processor 6 responds to manipulation of the keys by controlling operation of the receiver 2 and/or the display 11. The meter includes an internal power supply 15 in the form of replaceable or rechargeable batteries. The power supply is connected to supply power to all of the units comprising the meter I and to supply power to the LNB 3 via the receiver 2. The power supply is controlled by the processor 6, which is arranged to activate the power supply and thus switch on the meter in response to manipulation of the user input device 14.

In order to conserve power the processor 6 is arranged to monitor the time between manipulations of the input device 14 and to cause the power supply 15 to switch off if the time exceeds a predetermined duration, say 3 minutes. Power is restored when the installer next manipulates the input keys 14. The processor 6 and the power supply 15 may also cooperate to enable battery status information to be displayed on the display 11.

Television signals broadcast by satellites have several parameters which vary. Signals are transmitted on carriers at several different frequencies from a single satellite to enable the carriers to be distinguished from one another. Signals are polarized, either vertically or horizontally, to increase signal diversity. Some signals carry information in analogue form and others in digital form. Digital information is transmitted at different symbol rates and error correction ratios. During installation of an antenna it is only necessary to be able to identify with confidence a single signal from the selected satellite.

There are several combinations of the aforementioned signal characteristics that can be used to identify uniquely a signal as originating from the required satellite. For example both Eutelsat and Astra 28.2 transmit vertically polarized signals at 11.778 GHz carrying digital data at 27.5 Msymbols/s, but the data in the Eutelsat signal has a forward error correction ratio (FEC) of 3/4 whereas the data in the Astra signal has an FEC of 2/3. Thus a vertically polarized signal at 11.778 GHz carrying digital data at 27.5 Msymbols/s and an FEC of 2/3 uniquely identifies the Astra 28.2 satellite. Therefore, by tuning the receiver 2 to receive a signal with these characteristics, reception of the signal can be interpreted as indicating that the antenna is correctly aligned with the desired Astra 28.2 satellite.

A decision is made in advance regarding which characteristics can be used to identify uniquely the required satellite. Data defining those characteristics is stored in the RAM 12 and used by the processor to tune the receiver 2 to the appropriate signal.

During installation of an antenna an installer will first connect the meter to the LNB of the antenna by way of a suitable lead. The meter is then switched on by manipulating the input keys 14 and thus power is applied to the LNB via the lead. A suitable prompt may be shown on the display 11, for example "search for satellite". This will prompt the installer to search for the correct satellite by moving the antenna so that it is directed towards the general area of the skit in which the satellite will be found. When the antenna "sees" the correct satellite the meter will receive a signal with the unique characteristics and therefore the receiver will respond by outputting a locked flag on data path 9 to the processor. The processor 6 in turn responds to the locked signal by changing the display to indicate that the desired satellite has been found. A message such as "Now on Astra 28.2" may be displayed for example. An audible signal may also be output by suitable means (not shown).

Further manipulation of the input keys causes the processor to toggle through a series of options.

Firstly an indication of signal strength in the form of a graphical bar is displayed. The GEC Plessey NIM includes signal amplifier with an automatic gain control circuit that can be controlled to output data on data path 9 representing the gain setting. The gain setting is inversely proportional to signal strength (the greater the gain the weaker the received signal). The gain data from the receiver 2 is therefore processed by the processor 6 to generate appropriate data for display of the graphical bar. A weak signal indicates that the antenna is not aligned properly with the satellite or that the line of sight between the antenna and the satellite is not entirely clear. Thus the graphical signal strength bar enables the installer to adjust the position of the antenna to correct alignment with the satellite.

Depending on the position of the antenna 2 on the surface of the earth the LNB 3 may have to be skewed by a few degrees off the axis of the antenna so as to align properly with the polarized signals from the satellite. The GEC Plessey NIM includes signal processing circuitry which is able to output data indicating bit error rates in the received data in terms of bit errors per 1000 received bits. The bit error rate is an indication of the quality of the received signals. Therefore in another mode of operation the processor 6 is arranged to receive from the receiver 2, via data path 9, bit error rate data for both horizontally and vertically polarized signals. The processor 6 outputs this data to the display 11 for display thereon. The installer is then able to adjust the skew of the LNB 3 to maximize the quality of the received signals by equalizing the bit error rates of the horizontal and vertical signals.

Once it has been established that the antenna is pointing towards the correct satellite the installer should lock the antenna in position so that it remains fixed on the satellite.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. An antenna alignment meter comprising:
   a predetermined set of signal characteristics;
   a signal detector circuit for detecting a signal with said predetermined set of signal characteristics and outputting data pertaining to the detection of the signal;
   a connector for connecting the signal detector circuit to an antenna; and
   a controller responsive to the data from the detector circuit for controlling generation of an indicator that the signal has been detected;
   wherein the meter is configured to receive a single set of signal characteristics.

2. An antenna alignment meter as claimed in claim 1, wherein the signal detector circuit comprises a receiver circuit.

3. An antenna alignment meter as claimed in claim 1, wherein the receiver circuit is controlled by the controller to receive signals having said predetermined set of signal characteristics.

4. An antenna alignment meter as claimed in claim 1, wherein the controller comprises a processor having an associated memory in which is stored data representing the predetermined set of signal characteristics.

5. An antenna alignment meter as claimed in claim 4, further comprising a communications port, connected to the processor, for receiving data representing the predetermined set of signal characteristics.

6. An antenna alignment meter as claimed in claim 1, further comprising a display controlled by the controller for displaying information relating to a detected signal.

7. An antenna alignment meter as claimed in claim 1, wherein the meter is operable in plural different operating modes, the meter further comprising a user manipulable input connected to the controller for user selection of the operating modes.

8. An antenna alignment meter as claimed in claim 7, wherein the operating modes comprise a detection mode in which the detector is operable to detect a predetermined signal being received by an antenna connected thereto, thereby to facilitate alignment of the antenna with a signal source.

9. An antenna alignment meter as claimed in claim 7, wherein the detector comprises signal processing circuitry operable to process a signal being received by an antenna connected thereto to determine a data error rate in the received signal, and the operating modes comprise an antenna alignment mode in which the controller is operable to output data for display representing the quality of the signal depending on the data error rate, thereby to facilitate skewing of the antenna.

10. An antenna alignment meter as claimed in claim 9, wherein the processing circuitry is operable to determine data error rates for both horizontally and vertical polarized signals and the controller is operable to output data representing the quality of both horizontally and vertically polarized signals.

11. An antenna alignment meter as claimed in claim 7, wherein the detector comprises a signal amplifier including an automatic gain control circuit, and the operating modes comprise a signal strength mode in which data relating to the gain set by the automatic gain control circuit is used by the controller to generate a display representing the strength of a signal being received by the antenna.

12. An antenna alignment meter as claimed in claim 7, further comprising a power supply controlled by the controller, and wherein the operating modes comprise a standby mode in which the power supply is switched off following a predetermined period of non-use of the meter.

13. An antenna alignment meter as claimed in claim 12, wherein the period of non-use is measured as time elapsed between manipulations of the user manipulable input.

14. An antenna alignment meter as claimed in claim 1, wherein the predetermined set of signal characteristics are selected from the group consisting of:
frequency,
polarization,
data rate, and
forward error correction.

15. A method of aligning an antenna with a signal source, the method comprising:
storing a predetermined set of signal characteristics;
connecting the antenna to an antenna alignment meter;
adjusting the orientation of the antenna until the antenna alignment meter indicates detection of a signal with said predetermined set of signal characteristics; and
locking the antenna in position;
wherein the meter is configured to receive a single set of signal characteristics.

16. A method as claimed in claim 15, further comprising adjusting the orientation of the antenna until the antenna alignment meter indicates reception of a signal of substantially maximum strength.

17. A method as claimed in claim 15, further comprising adjusting the orientation of the antenna until the antenna alignment meter indicates reception of optimal quality.

18. A method as claimed in claim 17, wherein a signal of optimum quality is deemed to be received when the antenna alignment meter indicates reception of horizontally and vertically polarized signals with substantially equal bit error rates.

19. An apparatus for aligning an antenna with a signal source, the apparatus being arranged to monitor signals received by the antenna and to provide an indication of correct alignment of the antenna with a desired signal source when a signal of a predetermined frequency polarization, symbol rate and error correction ratio is received.

20. An antenna alignment meter comprising:
a controller for using predetermined signal characteristics to tune a receiver circuit to receive a signal with said predetermined signal characteristics and to output data pertaining to receipt of the signal; and
a connector for connecting the receiver circuit to an antenna; wherein
the controller is responsive to the data from the receiver circuit to control generation of an indicator that the signal has been received;
wherein the meter is configured to receive a single set of signal characteristics.

21. An antenna alignment meter as claimed in claim 20, wherein the controller comprises a processor having an associated memory in which is stored data representing the predetermined signal characteristics.

22. An antenna alignment meter as claimed in claim 21, further comprising a communications port, connected to the processor, for receiving data representing the predetermined signal characteristics.

23. An antenna alignment meter as claimed in claim 20, further comprising a display controlled by the controller for displaying information relating to the received signal.

24. An antenna alignment meter as claimed in claim 20, wherein the meter is operable in plural different operating modes, the meter further comprising a user manipulable input connected to the controller for user selection of the operating modes.

25. An antenna alignment meter as claimed in claim 24, wherein the operating modes comprise a detection mode in which the receiver circuit is operable to detect a predetermined signal being received by an antenna connected thereto, thereby to facilitate alignment of the antenna with a signal source.

26. An antenna alignment meter as claimed in claim 24, wherein the receiver circuit comprises signal processing circuitry operable to process a signal being received by an antenna connected thereto to determine a data error rate in the received signal, and the operating modes comprise an antenna alignment mode in which the controller is operable to output data for display representing the quality of the signal depending on the data error rate, thereby to facilitate skewing of the antenna.

27. An antenna alignment meter as claimed in claim 26, wherein the processing circuitry is operable to determine data error rates for both horizontally and vertically polarized signals and the controller is operable to output data representing the quality of both horizontally and vertically polarized signals.

28. An antenna alignment meter as claimed in claim 26, wherein the receiver circuit comprises a signal amplifier including an automatic gain control circuit, and the operating modes comprise a signal strength mode in which data relating to the gain set by the automatic gain control circuit is used by the controller to generate a display representing the strength of a signal being received by the antenna.

29. An antenna alignment meter as claimed in claim 24, further comprising a power supply controlled by the controller, and wherein the operating modes comprise a standby mode in which the power supply is switched off following a predetermined period of non-use of the meter.

30. An antenna alignment meter as claimed in claim 29, wherein the period of non-use is measured as time elapsed between manipulations of the user manipulable input.

31. An antenna alignment meter as claimed in claim 20, wherein the predetermined signal characteristic is selected from the group consisting of:

frequency, polarization, data rate, and forward error correction.

32. A method of aligning an antenna with a signal source, the method comprising:

connecting the antenna to an antenna alignment meter;

tuning a receiver circuit of the antenna alignment meter to receive a signal having predetermined characteristics;

then adjusting the orientation of the antenna until the antenna alignment meter indicates receipt of a signal with said predetermined signal characteristics; and locking the antenna in position;

wherein the meter is configured to receive a single set of signal characteristics.

33. A method as claimed in claim 32, further comprising adjusting the orientation of the antenna until the antenna alignment meter indicates reception of a signal of substantially maximum strength.

34. A method as claimed in claim 32, further comprising adjusting the orientation of the antenna until the antenna alignment meter indicates reception of optimal quality.

35. A method as claimed in claim 34, wherein a signal of optimum quality is deemed to be received when the antenna alignment meter indicates reception of horizontally and vertically polarized signals with substantially equal bit error rates.

* * * * *